CONTROL DEVICE FOR METERED VEHICLES

Filed Sept. 11, 1959 2 Sheets-Sheet 1

INVENTOR
Harry H. Canavotto
BY Frank P. Cyr
ATTORNEY

June 19, 1962 H. H. CANAVOTTO 3,039,556
CONTROL DEVICE FOR METERED VEHICLES
Filed Sept. 11, 1959 2 Sheets-Sheet 2
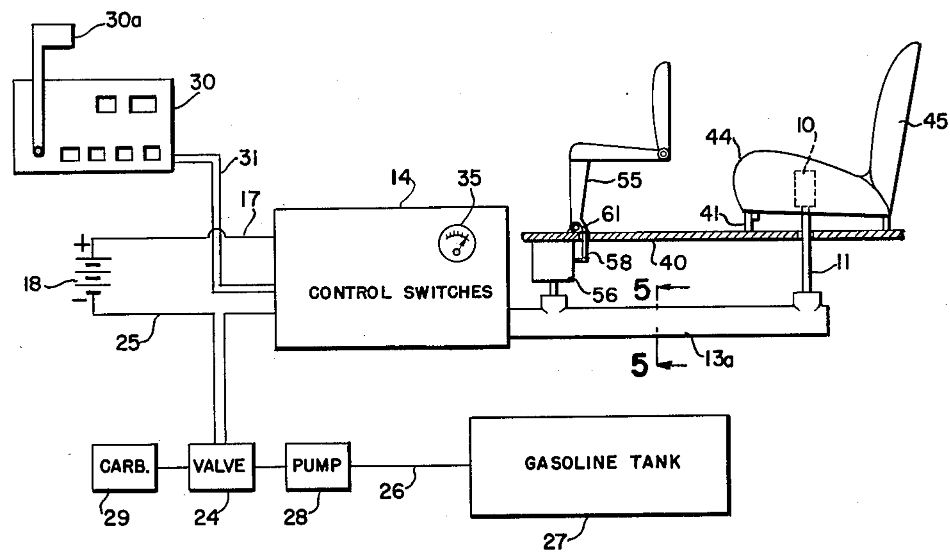
FIG. 2.
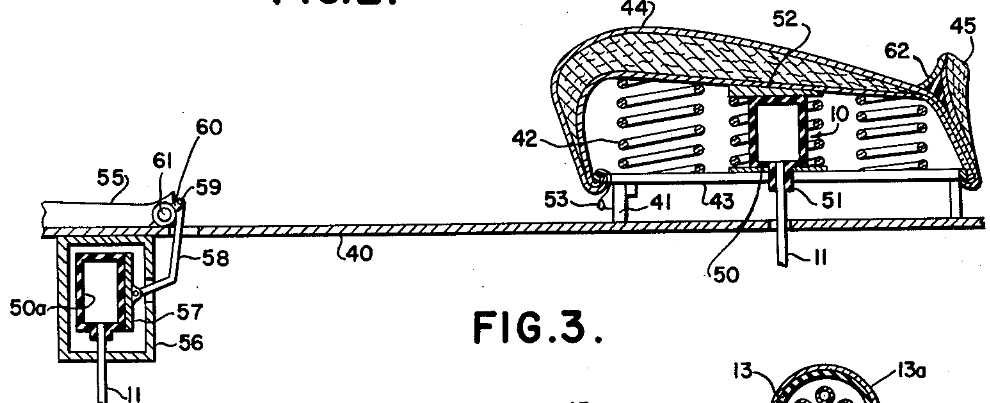
FIG. 3.
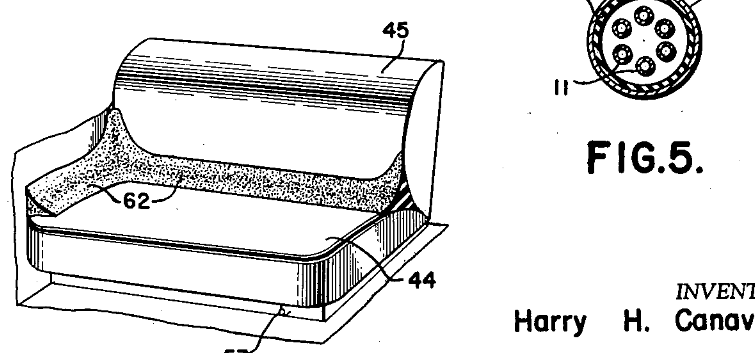
FIG. 4.
FIG. 5.
INVENTOR
Harry H. Canavotto
BY Frank P. Cyr
ATTORNEY United States Patent Office 3,039,556

Patented June 19, 1962

3,039,556

CONTROL DEVICE FOR METERED VEHICLES

Harry H. Canavetto, 114—27 Farmer's Blvd., St. Albans 12, L.I., N.Y.

Filed Sept. 11, 1959, Ser. No. 839,451
5 Claims. (Cl. 180—82)

This invention relates to a control device for metered vehicles, and has as its primary object the provision of a means in association with a motor vehicle for rendering the vehicle inoperative under predetermined conditions, as for example in a taxi carrying passengers, unless the meter is in operative position.

As conducive to a clearer understanding of this invention, it may here be pointed out that large taxicab organizations are frequently subjected to monetary losses by unscrupulous drivers who accept fares, drive them to their destination, and receive and pocket the fare therefor without moving the taxi meter to operative position. In large organizations employing large numbers of drivers, a relatively small percentage of dishonest or unscrupulous drivers may occasion a substantial loss to the company. In instances where the companies operate at a small margin of profit this may make the difference between profit and loss during a day's operation. Various expedients have been attempted to stamp out this practice, some taking the form of supervision of the drivers, and others the form of mechanical expedients which will prevent the operation of the cab unless the flag is in "down" or registering position. These mechanical expedients have, in the main, been only slightly effective, or completely ineffective due to the fact that a dishonest driver will immediately endeavor to find means for circumventing the mechanical control. An important object of this invention is, therefore, the provision of a mechanical device which will render the vehicle inoperative, by cutting off the fuel supply, or some similar expedient, if a passenger is in the vehicle, unless the meter flag is down.

An additional very important object of the invention is the provision of such a device which is sufficiently protected so that if an attempt is made to render it inoperative, such damage must be done to the apparatus as to be immediately apparent upon inspection.

A further object of the invention is the provision of such a device wherein all of the operative parts are protectively encased, so that a relatively high degree of physical force is necessary to obtain access thereto, and that such physical force will result in such a disruption of the apparatus as to be readily apparent.

A further important object of the invention is the provision of such a device particularly adapted for use with taxicabs wherein the presence of a passenger or rider on any seat of the vehicle other than the driver's seat will be effective to render the vehicle inoperative unless the meter flag is down.

A further object of the invention is the provision of such a device so arranged that when the vehicle is empty except for the driver, the vehicle may cruise for any desired length of time or distance with the flag in inoperative or "up" position.

Still other objects of the invention reside in the combinations of elements, arrangements of parts, and features of construction, all as will be more fully pointed out hereinafter and shown in the accompanying drawings, wherein:

FIGURE 2 is a further schematic view of the apparatus shown in association with a taxicab or similar vehicle, including a meter, a rear seat, and a foldable seat.

FIGURE 3 is an enlarged fragmentary detail sectional view of one form of apparatus by means of which the objects of this invention may be achieved, and, FIGURE 4 is a fragmentary perspective view showing a means for shielding the seat of the vehicle to prevent damage or disconnection of the apparatus.

FIGURE 5 is a cross sectional view taken on line 5—5 of FIGURE 2.

Similar reference characters refer to similar parts throughout the several views of the drawings.

Figure 1:
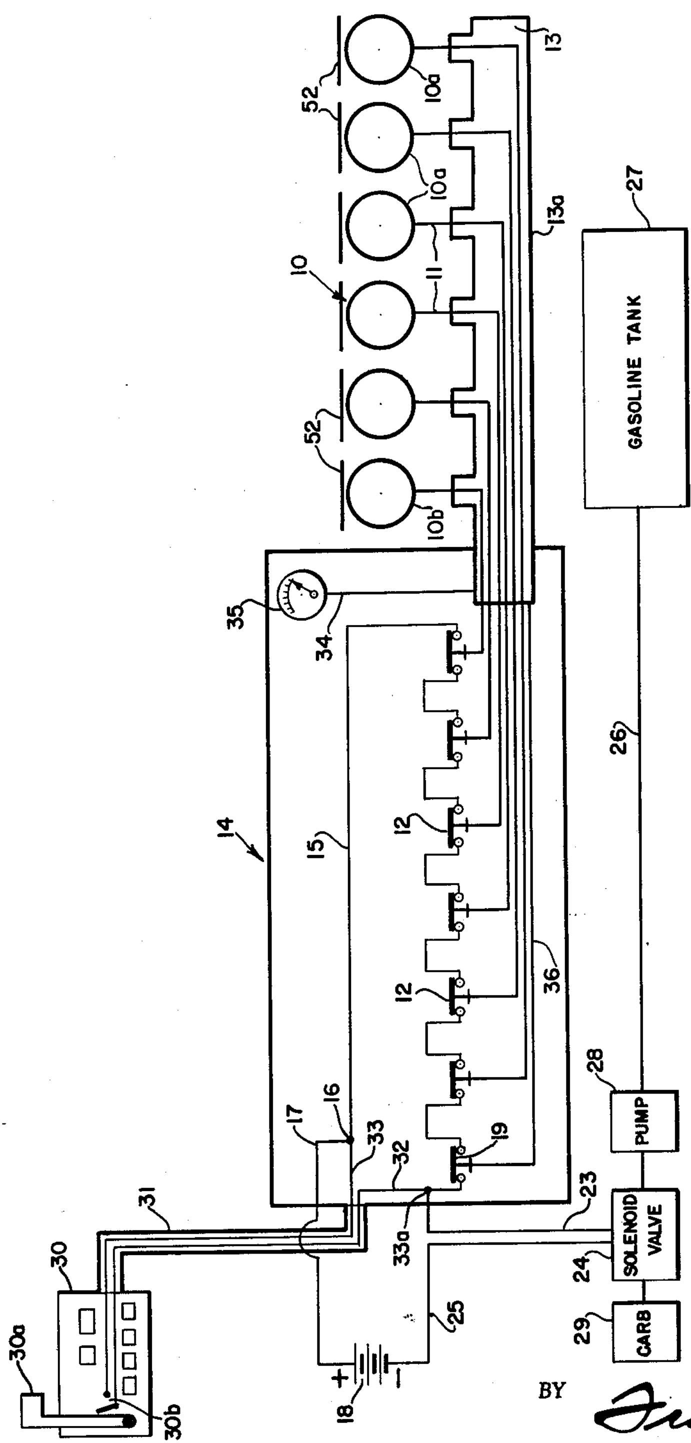
FIGURE 1 is a diagrammatic view of one form of apparatus incorporating the features of the instant invention.

Having reference now to the drawings in detail, and more particularly to FIGURE 1, the device of the instant invention comprises a plurality of pressure responsive elements, generally indicated at 10, one of which is adapted to be associated with each seat of a vehicle, such as a taxicab, with the exception of the driver's seat. It is desirable that the back seat, for instance, have three equally spaced pressure responsive devices, one being positioned centrally of the seat to be responsive to a person occupying this position of the seat and the other two pressure responsive devices being mounted on either side of the said centrally located pressure responsive device to be responsive to occupants occupying these positions of the seat.

Each pressure responsive element 10 is connected by means of a tube or conduit 11 with a pressure responsive switch 12. Each tube or conduit 11 extends through a puncture proof tube 13, one end of which extends into a switch control box generally indicated at 14, which contains the series of switches 12. In order to prevent the rupture of any of the conduits 11 and or conduit 13 both of which are formed of puncture proof material, an armor shield **13*a* is placed about the puncture proof tube 13. The switches 12 are connected in series to a hot line 15, which extends to a junction 16 interiorly of the box, from which a line 17 extends to the conventional battery 18 of the vehicle. The switches 12 are connected to a pressure responsive switch member 19, from which a line 23 extends to a normally open solenoid valve 24**.

The solenoid valve 24 is positioned in the fuel line 26 of the vehicle, which extends from the gasoline tank 27 through the pump 28 to the carburetor 29, from which a line extends to the motor of the vehicle in a conventional manner.

The vehicle is provided with a conventional taxi meter 30, from which a shielded cable 31 extends to the interior of the box 14. A line 32 extends from the battery 18 through the cable 31 to a switch **30*b* in the meter and a line 33 extends through the cable 31 to a junction 16**.

A constant relatively slight pressure is maintained in the puncture proof tube 13, and is indicated through line 34 on a pressure gauge 35, and the pressure, through a line 36, normally maintains switch 19 in closed position.

The arrangement is such that when no pressure is exerted on any one of the pressure responsive elements 10, such as would be occasioned by a passenger on the seat, a circuit flows from the battery 18 through the wires 17 and 15 and all of the normally closed switches 12 and switch 19 through the junction **33*a* and the line 23 to the solenoid valve 24, and thence to a ground. As long as the circuit remains closed, the valve 24 remains open and the fuel may pass from the gasoline tank 27 to the carburetor 29. However, when a passenger sits on any seat in the vehicle exerting pressure on any one of the pressure responsive elements 10, the associated switch 12 is opened breaking the circuit. The solenoid valve 24 may have any suitable time delay mechanism, of conventional nature, associated therewith, to retard its action after the initial breaking of the circuit for a brief period, such as one minute, in order to enable the driver to move the flag 30*a* of the meter 30 to "down" or registering position. This action will serve to close the switch 30*b* in the meter whereupon a circuit is established from the battery 18 through the wire 17, the junction 16, the wire 33, switch 30*b* and wire 32 to the solenoid valve 24, to maintain the same in open position and thence through return line 25 to battery 18**.

Under these conditions when the flag is in registering position, the flow of fuel from the gasoline tank to the carburetor is uninterrupted, and the vehicle may continue to operate normally.

Referring now to FIGURES 2 and 3, there is indicated diagrammatically at 40 the rear floor board of the vehicle upon which is mounted a rear seat frame 41. The frame 41 carries a seat assembly including the conventional inner springs 42 seated on a lower plate 43, and the upholstered or padded seat portion 44, the seat back being indicated at 45.

Three of the units 10, indicated at **10*a*, schematically in FIGURE 1, are positioned in the three seat positions of the rear seat. Each pressure responsive unit includes a compressible tubular member 50, which contains air or another suitable fluid under pressure, and which is in continuous communication with its associated conduit 11. Each member 50 may include a sealing gasket 51, completely enclosing the system. In order to prevent puncturing of the unit from above, an armored metallic or other protective shield 52 is positioned over each unit 50. In order to prevent access to the units by unauthorized persons, the seat may be connected to the seat frame by means of a wire 53, which is sealed by a conventional soft metal sealing disc, which may be suitably stamped in a known or conventional manner. It will thus be seen that the presence of a passenger in any position on the back seat will cause the distortion or compression of the associated unit 50, which will cause an increase of pressure in the associated line, which will be transmitted to the associated pressure responsive switch 12, causing the same to break the circuit from the battery 18 to the solenoid valve 24. As above described, this will result in the closure of the valve, and the stoppage of the vehicle unless the meter is moved to registering position. A similar arrangement is employed for the seat beside the driver at the front of the vehicle, and as designated at 10*b*** in the diagrammatic showing of FIGURE 1.

Similar devices are provided for the foldable seats 55, which are usually provided in taxicabs, but in this instance due to the arrangement of the seats a pressure responsive element **50*a* is adapted to be compressed by means of a plate 57, which is pivotally connected to a link 58, which is in turn connected by means of a pivot 59 to a lug 60 which extends from the axle 61 on which the foldable seat 55 is mounted. Obviously when the seat 55 is moved to the "up" position as indicated in FIGURE 3, pressure is exerted on the plate 57 to distort the compressible member 50*a*, and by an increase in the pressure, break the contact of its associated pressure responsive switch 12. When the seat is in the "down" position, as indicated by the fragmentary view shown in FIGURE 3, no pressure is exerted on the compressible member 50*a***, and in consequence the circuit through this particular switch remains unaffected.

The loss of small objects by passengers into the space between the seat and seat back frequently occurs under normal conditions, and in order to prevent such an occurrence being utilized as an excuse for removal of the seat, and breaking the seal of the wire 53, a protective padding generally indicated at 62 in FIGURE 4 is provided, having rounded edges, to completely close such spaces, so that there will be no occasion for unauthorized removal or displacement of the seat such as might permit access to the compressible members 50 for tampering therewith.

As previously mentioned, each of the tubes 11 leads into a puncture proof tube 13, which may be suitably armored, or protected with a flexible or lead sheath, or the like, and in which a slight pressure is constantly maintained. This pressure may be in the neighborhood of five to ten pounds, and is constantly indicated on the gauge 35, in order to indicate that the device is in operative condition. Any tampering with or puncture or closing off of the protective conduit 13 will be reflected in a drop in pressure which will open switch 19, rendering the device inoperative, and such condition will immediately be detectable on the gauge, by an inspector. The tube 13 extends directly into the sealed box 14, as does the conduit 31 from the meter 30. The box 14 may be provided with any suitable locked closure, to which access may be had only by authorized persons. It will thus be seen that the entire unit is substantially sealed in such manner that tampering therewith is effectively precluded.

Any suitable conventional valve means may be employed for renewing the pressure in any of the pressure responsive devices.

While in the foregoing the apparatus of the instant invention has been described particularly in connection with taxi meters or the like, it will be understood that it may be readily applicable to a number of other uses, as for example in military or other vehicles to preclude the unauthorized use thereof for passenger transportation, in which case a mileage meter or the like may be substituted for the fare meter of the taxi, the arrangement being such that the carrying of unauthorized passengers is precluded unless the mileage meter is in operation.

The device may also be employed to prevent overloading of vehicles, in which case an overload on a pressure responsive element will serve to discontinue the flow of fuel to the motor of the vehicle.

Correspondingly, instead of a solenoid valve in the fuel line, a contact may be broken in the ignition system, or some other similar expedient employed for rendering the vehicle inoperative except in the presence of predetermined desired conditions.

When the device of the instant invention is employed in a taxicab it will be seen that, as above described, the vehicle is rendered inoperative when any person is in the vehicle on any seat thereof except the driver, unless the meter flag is down. However, the cab may cruise indefinitely with the flag up, as long as there are no passengers in the vehicle.

Similarly, in order to render the vehicle operative, it is simply necessary to throw the flag to operative position to reestablish the circuit maintaining the solenoid valve in fuel-admitting position.

In the event that for any reason the device becomes inoperative so that the vehicle will not move unless the flag is in meter operating position, it is only necessary that the driver call in to the dispatcher and give his mileage and report that he is bringing the vehicle in for repairs. Then, by moving the meter flag to fare registering position, the vehicle will become operative, and may proceed to its headquarters without the necessity of sending a repair man out to the vehicle.

From the foregoing it will now be seen that there is herein provided an apparatus which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In combination with a motor vehicle having a motor, a fuel line therefor, a plurality of seats, a meter having an operative and inoperative position, and a battery, a pressure responsive device associated with each seat, a pressure conduit connected to each pressure responsive device, an electrical circuit including said battery, a normally closed pressure responsive switch in said circuit for each pressure conduit, a solenoid in said circuit, a normally open valve in said fuel line movable to closed position by de-energization of said solenoid, the opening of any one of said switches by its associated pressure responsive device serving to de-energize said solenoid to close said valve, a normally open switch in said circuit bypassing said pressure responsive switches, and means to close said last mentioned switch upon movement of said meter to operative position.

2. In combination with a motor vehicle having a motor, a fuel line therefor, a plurality of seats, a meter having an operative and inoperative position, and a battery, a pressure responsive device associated with each seat, a pressure conduit connected to each pressure responsive device, each said pressure responsive device comprising a flexible resilient member adapted to be compressed by the weight of a passenger sitting in its associated seat, an electrical circuit including said battery, a normally closed pressure responsive switch in said circuit for each pressure conduit, a solenoid in said circuit, a normally open valve in said fuel line movable to closed position by de-energization of said solenoid, the opening of any one of said switches by its associated pressure responsive device serving to de-energize said solenoid to close said valve, a normally open switch in said circuit bypassing said pressure responsive switches, and means to close said last mentioned switch upon movement of said meter to operative position.

3. In combination with a motor vehicle having a motor, a fuel line therefor, a plurality of seats, a meter having an operative and inoperative position, and a battery, a pressure responsive device associated with each seat, a pressure conduit connected to each pressure responsive device, each said pressure responsive device comprising a flexible resilient member adapted to be compressed by the weight of a passenger sitting in its associated seat, an electrical circuit including said battery, a normally closed pressure responsive switch in said circuit for each pressure conduit, a solenoid in said circuit, a normally open valve in said fuel line movable to closed position by de-energization of said solenoid, the opening of any one of said switches by its associated pressure responsive device serving to de-energize said solenoid to close said valve, a normally open switch in said circuit bypassing said pressure responsive switches, means to close said last mentioned switch upon movement of said meter to operative position, and a protective enclosure containing all of said switches.

4. In combination with a motor vehicle having a motor, a fuel line therefor, a plurality of seats, a meter having an operative and inoperative position, and a battery, a pressure responsive device associated with each seat, a pressure conduit connected to each pressure responsive device, each said pressure responsive device comprising a flexible resilient member adapted to be compressed by the weight of a passenger sitting in its associated seat, an electrical circuit including said battery, a normally closed pressure responsive switch in said circuit for each pressure conduit, a solenoid in said circuit, a normally open valve in said fuel line movable to closed position by de-energization of said solenoid, the opening of any one of said switches by its associated pressure responsive device serving to de-energize said solenoid to close said valve, a normally open switch in said circuit bypassing said pressure responsive switches, means to close said last mentioned switch upon movement of said meter to operative position, a protective enclosure containing all of said switches, and an armored conduit containing and protecting said pressure conduits.

5. In combination with a motor vehicle having a motor, a fuel line therefor, a plurality of seats, a meter having an operative and inoperative position, and a battery, a pressure responsive device associated with each seat, a pressure conduit connected to each pressure responsive device, each said pressure responsive device comprising a flexible resilient member adapted to be compressed by the weight of a passenger sitting in its associated seat, an electrical circuit including said battery, a normally closed pressure responsive switch in said circuit for each pressure conduit, a solenoid in said circuit, a normally open valve in said fuel line movable to closed position by de-energization of said solenoid, the opening of any one of said switches by its associated pressure responsive device serving to de-energize said solenoid to close said valve, a normally open switch in said circuit bypassing said pressure responsive switches, means to close said last mentioned switch upon movement of said meter to operative position, a protective enclosure containing all of said switches, an armored conduit containing and protecting said pressure conduits, means maintaining air under slight pressure in said armored conduit, and a gauge indicating said pressure.

References Cited in the file of this patent

UNITED STATES PATENTS

| | | |
|---|---|---|
| 930,761 | Jacka | Aug. 10, 1909 |
| 1,507,483 | Holmquist | Sept. 2, 1924 |
| 1,541,541 | Weiss | June 9, 1925 |
| 1,737,161 | Jupp | Nov. 26, 1929 |
| 1,781,099 | Brownell | Nov. 11, 1930 |
| 2,194,273 | Booth | Mar. 19, 1940 |
| 2,861,644 | Martin | Nov. 25, 1958 |